United States Patent [19]
Hori et al.

[11] Patent Number: 5,587,930
[45] Date of Patent: Dec. 24, 1996

[54] FAULT DIAGNOSIS DEVICE

[75] Inventors: Satoshi Hori; Teruyo Omori, both of Amagasaki; Makoto Sakagami, Nagoya, all of Japan

[73] Assignee: Mitsubishi Denki Kabushiki Kaisha, Tokyo, Japan

[21] Appl. No.: 739,591

[22] Filed: Jul. 24, 1991

[30] Foreign Application Priority Data

Jul. 24, 1990 [JP] Japan .................... 2-198273

[51] Int. Cl.$^6$ .................................. G01B 7/00
[52] U.S. Cl. ............... 364/551.01; 364/550; 364/580; 395/911; 395/912; 395/914; 395/915
[58] Field of Search ............... 364/550, 551.01, 364/580; 395/911–918; 371/15.1, 25.1, 20.1, 11.3

[56] References Cited

U.S. PATENT DOCUMENTS

| | | | |
|---|---|---|---|
| Re. 31,247 | 5/1983 | Johnstone | 364/138 |
| 4,817,092 | 3/1989 | Denny | 371/11.3 |
| 4,839,823 | 6/1989 | Matsumoto | 364/550 |
| 4,841,456 | 6/1989 | Hogan, Jr. et al. | 371/25.1 |
| 4,970,725 | 11/1990 | McEnroe et al. | 364/551.01 |
| 5,090,014 | 2/1982 | Polich et al. | 371/15.1 |
| 5,107,497 | 4/1992 | Lirov et al. | 371/15.1 |
| 5,127,005 | 6/1992 | Oda et al. | 395/916 |

OTHER PUBLICATIONS

Cantone, Lander, Marrone and Gaynor; IN–ATE™: Fault Diagnosis, as Expert System Guided Search, 1987 pp. 8, 13, 16, 27, 30, 32 (no month).
Cantone, *Diagnostic Reasoning With IN–ATE®*, "A. I. '87" Conference, (1987), pp. 27–32.

*Primary Examiner*—James P. Trammell
*Assistant Examiner*—Hal D. Wachsman
*Attorney, Agent, or Firm*—Rothwell, Figg, Ernst & Kurz

[57] ABSTRACT

A fault diagnosis device searches for causes of fault of a device under test via a fault tree having a tree structure corresponding to the hardware organization of the device under test, where the nodes of the fault tree correspond to the units of the device under test. Some of the nodes including the root node have three or more child nodes. A test table associated with each node other than a leaf includes: a description of parameters to be detected by detector units; test conditions with respect to the parameters detected by the detector units; and fault probability table representing the fault probability values and the child node names corresponding to the respective patterns of results of the tests. The whole fault tree may be divided into a main fault tree stored in the main memory and fault branch trees stored in auxiliary memory. Then, the fault branch trees are loaded into the main memory when needed.

3 Claims, 5 Drawing Sheets

FAULT DIAGNOSIS DEVICE

BACKGROUND OF THE INVENTION

This invention relates to fault diagnosis devices for diagnosing causes of faults of various devices and apparatus such as industrial machines or of systems of such devices, etc.

A conventional fault diagnosis device is disclosed, for example, in R. Cantone, "Diagnostic Reasoning With IN-ATE™", Proceedings of A. I. '87 Conference, April, 1987. The diagnosis by means of such fault diagnosis device is effected in accordance with the binary search tree of FIG. 5. Thus, first a test t7 16 at the root node of the fault tree is effected, and the result of true (t) or false (f) is obtained. When the result is false (f), a test t1 17 is effected. If the result at the test t1 17 is false (f), a UUT (unit under test) input fault 18 is inferred. If the result at the test t1 17 is true (t), the test t3 19 is performed, to continue the diagnosis.

The above conventional fault diagnosis device effects diagnosis via a binary fault tree. Thus, it has the following two disadvantages.

First, it is incapable of performing two or more test simultaneously and comparing the obtained observation data so as to determine one cause from among three or more causes of fault or from an intermediate hypothesis on causes of fault.

Second, in the case where the devices under test are complicated, the binary fault tree therefor becomes large and complicated. Thus, the preparation of the fault tree becomes difficult. Further, when the whole fault tree cannot be loaded into the main memory of the computer, the execution of the diagnosis becomes extremely slow or even infeasible.

SUMMARY OF THE INVENTION

It is therefore an object of this invention to provide a fault diagnosis device which is capable of effecting two or more tests simultaneously and, via the results of these tests, of determining one from among three or more causes of fault. A further object is to provide such a fault diagnosis device which is capable of performing a large-scale diagnosis efficiently.

The above objects are accomplished in accordance with the principle of this invention by a fault diagnosis device which comprises:

detector means for detecting parameters of a device under test;

memory means;

a fault tree stored in said memory means and having nodes corresponding to respective sub-units of said device under test, whereby said fault tree has a tree structure corresponding to a hardware organization of said device under test;

test tables stored in said memory and associated with respective nodes of said fault tree, each test table including: a description of at least one parameter to be detected by said detector means; at least one test condition with respect to the parameter detected by said detector means; and a fault probability table representing fault probabilities and names of child nodes corresponding to respective results of said test condition; and search/inference means for searching for and determining a cause of fault of said device under test in accordance with said fault tree and said test tables;

wherein at least one of said nodes has at least three child nodes and the test table associated with the node having at least three child nodes includes: a description of at least two parameters to be detected by said detector means; at least two test conditions with respect to the two parameters detected by said detector means; and a fault probability table representing fault probabilities and names of child nodes corresponding to respective patterns of results of said test conditions.

Preferably the root node of said fault tree has at least three child nodes. Further, it is preferred that the memory means comprises a main memory and a auxiliary memory, and said fault tree is divided into a main fault tree stored in said main memory and fault branch trees stored in the auxiliary memory, said search/inference means loading a fault branch tree into the main memory when necessary.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

Figure 1:
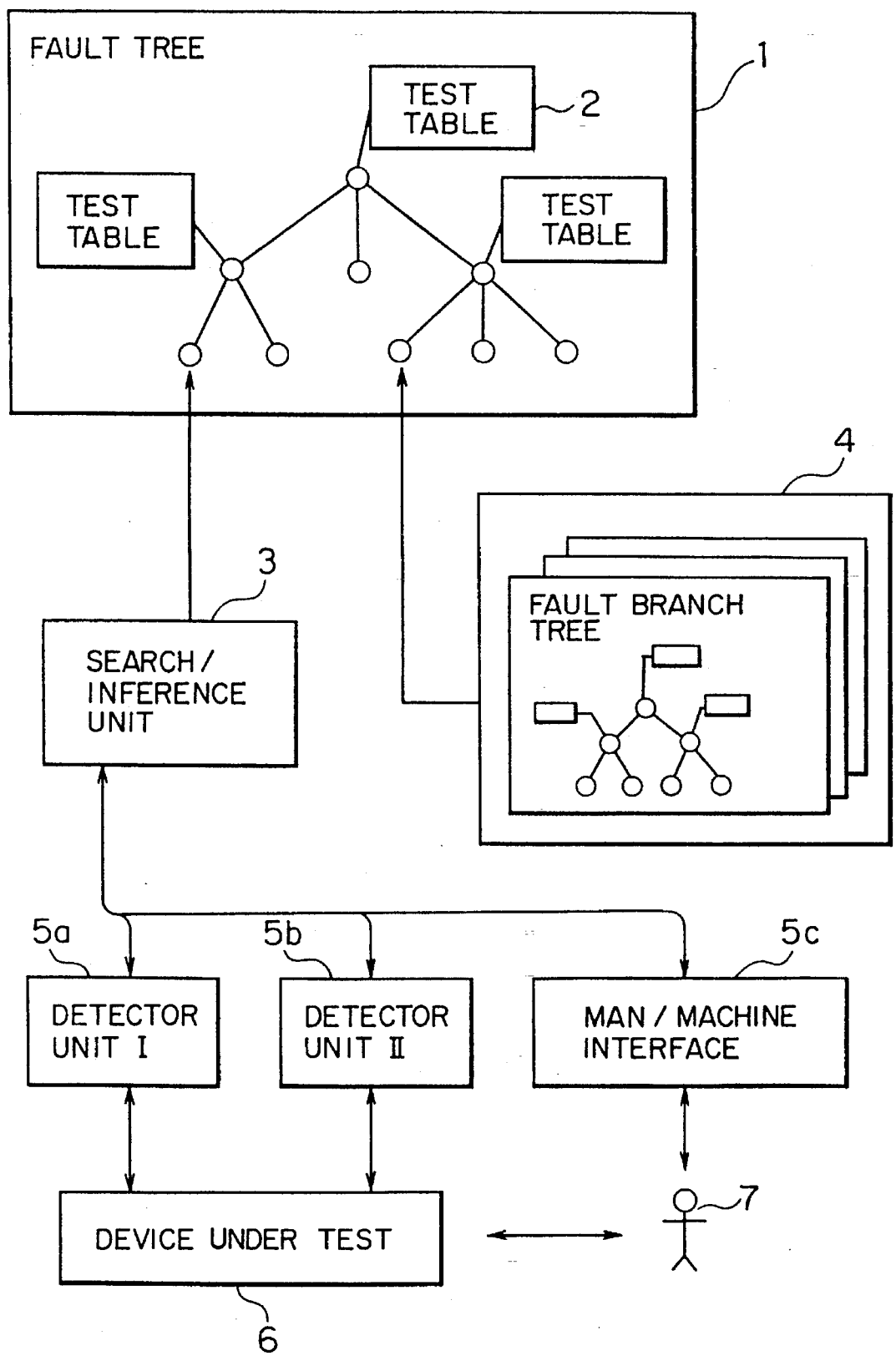
FIG. 1 is a block diagram showing the organization of a fault diagnosis device according to an embodiment of this invention.

FIG. 1 is a block diagram showing the organization of a fault diagnosis device according to an embodiment of this invention. The fault diagnosis device may be implemented by a computer and peripheral devices. The high-speed main memory 1 of the computer stores a main fault tree by which the causes of fault are searched for to effect the diagnosis of the device under test 6. The main memory 1 also stores test tables associated with respective nodes. Each node corresponds to a hardware sub-unit of the device under test 6, and at each node of the fault tree is stored the node name which represents the sub-unit of the device under test 6 corresponding thereto. Further, as described hereinbelow, at each node are stored the probabilities of fault of the sub-units of the device under test 6 associated with the nodes and, where necessary, the name of the fault branch tree to be connected to the main fault tree stored in the main memory 1. These fault branch trees are stored in a auxiliary memory 4 and are loaded into the main memory 1 when needed.

A search/inference unit 3, which may be implemented by a program, searches for the causes of fault via the fault tree loaded in the main memory 1. Detector units, such as a detector unit I 5a and detector unit II 5b in FIG. 1, detect the states (i.e., parameters), such as voltages, currents, temperatures, and error codes, of the device under test 6. A man/machine interface 5c asks for an input of the fault state from, or gives repair instructions to, an analyst 7.

Figure 2:
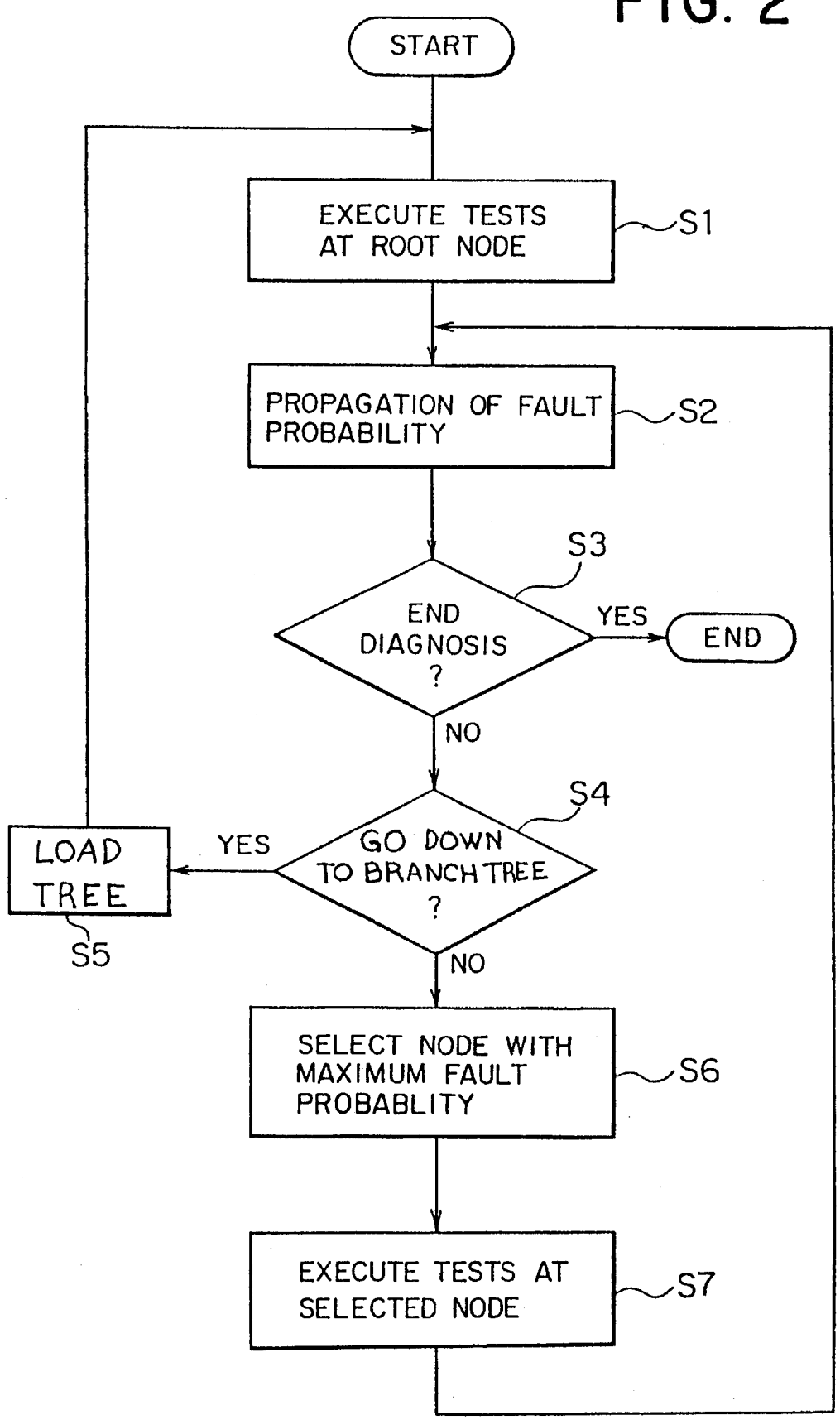
FIG. 2 is a flowchart showing the diagnosis procedure utilized by the fault diagnosis device of FIG. 1.
Figure 3:
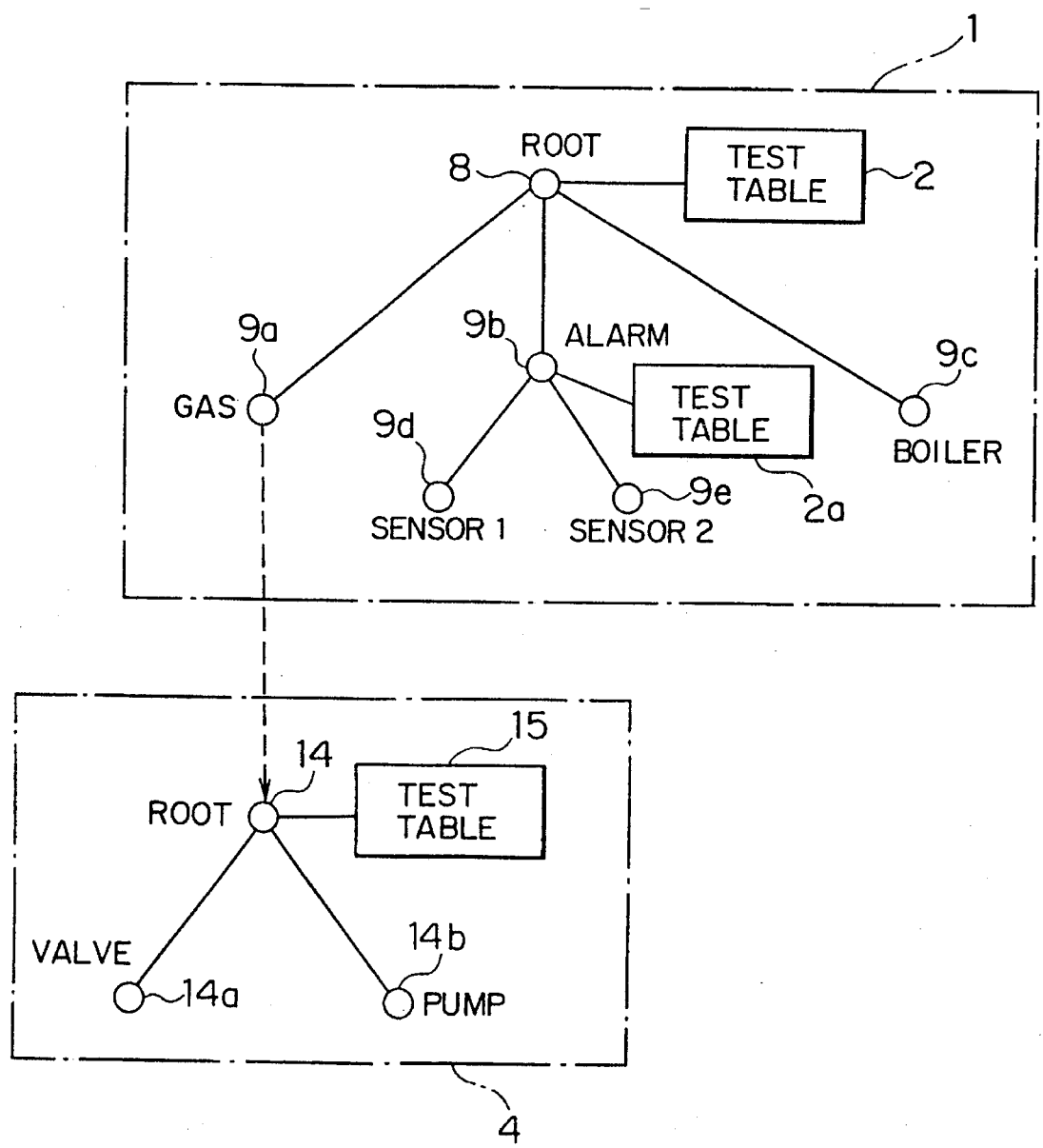
FIG. 3 shows in greater detail the organization of the main fault tree and a fault branch tree loaded in the main memory of the fault diagnosis device of FIG. 1.
Figure 4:
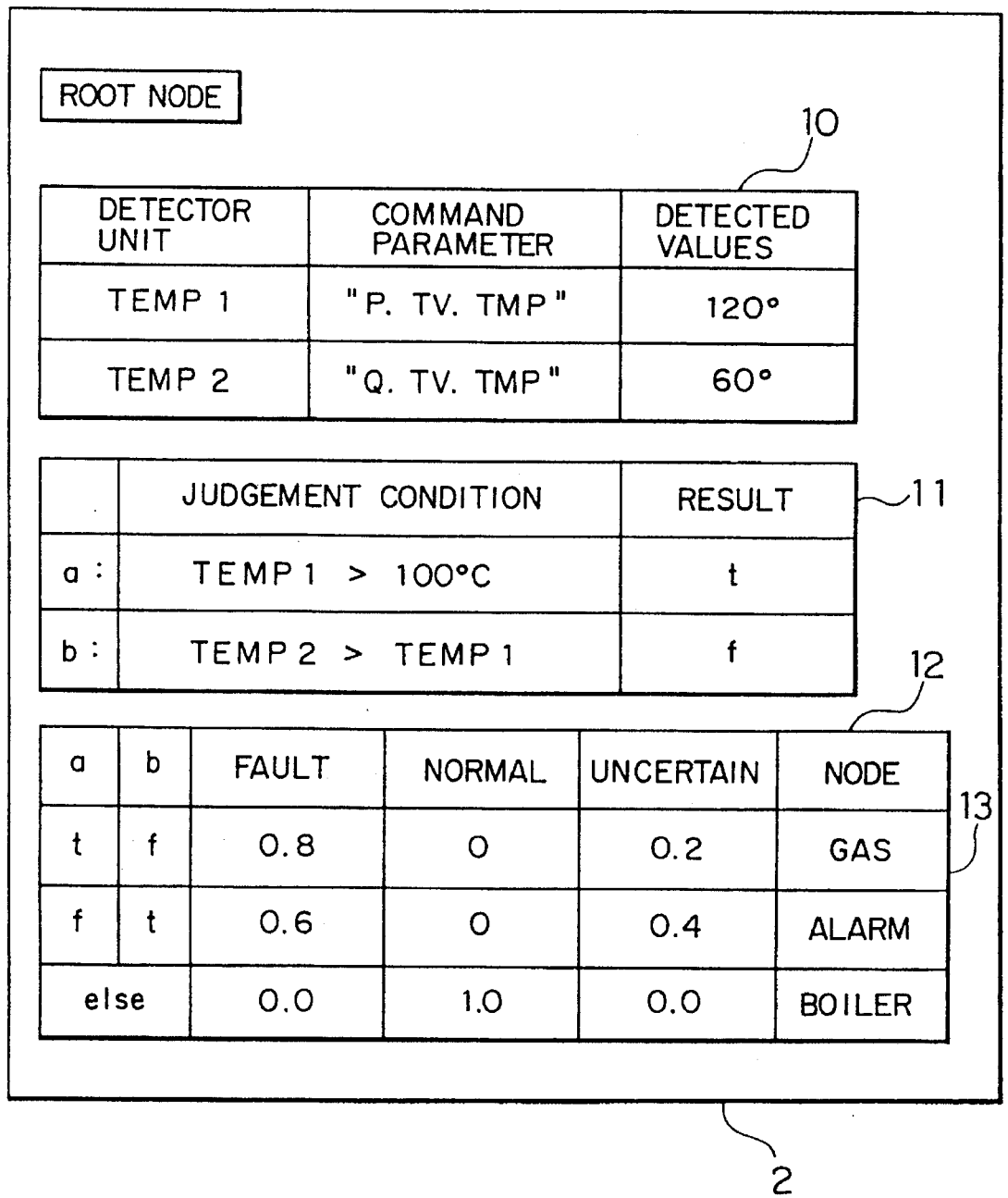
FIG. 4 shows the details of the test table at the root node of the fault tree of FIG. 3.
Figure 5:
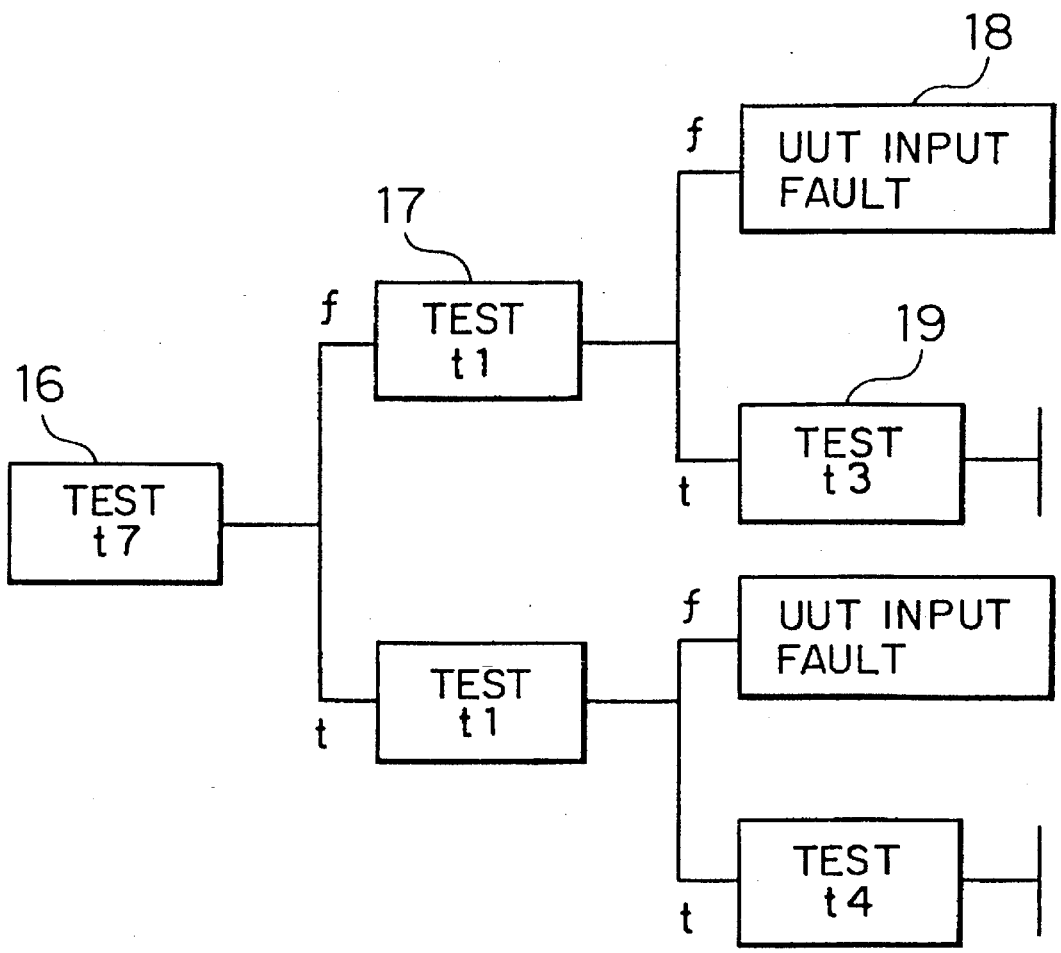
FIG. 5 is a diagram showing the fault tree by which a conventional fault diagnosis device searches for and infers the cause of a fault of a device under test.

FIG. 2 is a flowchart showing the diagnosis procedure utilized by the fault diagnosis device of FIG. 1, and FIG. 3 shows in greater detail the organization of the main fault tree and a fault branch tree loaded in the main memory of the fault diagnosis device of FIG. 1. FIG. 4 shows the details of the test table at the root node of the fault tree of FIG. 3.

As shown in FIG. 3, the root node 8 has three child nodes, a gas unit node 9a, a alarm unit node 9b, and a boiler unit node 9c, which correspond to the sub-units, i.e., the gas unit, the alarm unit, and the boiler unit, of the device under test 6, respectively. A fault branch tree stored in the auxiliary memory 4 and including a root node 14 and two child nodes, a valve node 14a and a pump node 14b, is loaded into the main memory 1 to be coupled to the gas unit node 9a and thereby to continue the main fault tree from the gas unit node 9a. On the other hand, the two child nodes, sensor 1 node 9d and sensor 2 node 9e, of the alarm unit node 9b are stored in the main memory 1 from the start. Another fault branch tree (not shown) which is to be connected to the boiler unit node 9c to form an integral part of the fault tree therefrom is loaded into the main memory 1, when necessary. A test table is associated with each node which has child nodes. Thus, a test table 2 and a test table 2a are associated with the root node 8 and the alarm unit node 9b of the main fault tree, respectively. A test table 15 is associated with the root node 14 of the fault branch tree to be coupled to and identified with the gas unit node 9a.

The diagnosis is effected in accordance with the procedure shown in FIG. 2.

At step S1, the test table 2 at the root node 8 of the main fault tree is selected by the search/inference unit 3. FIG. 4 shows the details of the test table at the root node of the fault tree of FIG. 3. In the first column of a detection table 10 are stored names of detector units, TEMP1 and TEMP2, which in this case detect respective temperatures within the device under test 6. When the search/inference unit 3 selects this test table 2 at step S1, the detector units stored in the detection table 10 are activated, and the command parameters stored in the second column of the detection table 10 are transmitted to the respective detector units. In response thereto, the detector units detects the values as commanded. The values or parameters, 120 and 60 degrees, respectively, detected by respective detector units are stored in the third column of the detection table 10.

A judgment table 11 of the test table 2 stores a plurality of judgment or test conditions with respect to the detected parameters. In the case shown in FIG. 4, two judgment test conditions a and b are stored in the first and the second row. The search/inference unit 3 judges whether or not the conditions in respective rows a and b are met or not, and stores the judgment test result, true (t) or false (f), in the last column of the judgment table 11. In the case shown in FIG. 4, the result is true (t) for the first condition a, and is false (f) for the condition b.

A fault probability table 12 of the test table 2 stores the values of fault probability and the names of the child nodes associated with the results of judgments stored in the judgment table 11. In the case shown in FIG. 4, the first row corresponds to the result pattern of true (t) for the condition a and false (f) for the condition b. Then, the probability of an occurrence of fault of the gas unit (indicated by the child node name in the last column) is 0.8, while the normal probability thereof is 0. The uncertain probability is 0.2. Similarly, the second row corresponds to the result pattern of false (f) for the condition a and true (t) for the condition b. Then, the probability of an occurrence of fault of the alarm unit is 0.6, while the normal probability thereof is 0. The uncertain probability is 0.4. The third row (designated by "else") corresponds to the remaining result patterns, where the normal probability is 1.

Thus, the search/inference unit 3 reads out the probabilities and the name of the child node corresponding to the pattern of results of judgment test stored in the judgment table 11. For example, in the case where the results are as shown in the judgment table 11 in FIG. 4, the first row of the fault probability table 12 is selected by the search/inference unit 3 from among the three rows. Thus, the fault probability 0.8 associated with the gas unit node 9a is read out. This completes the step S1.

At step S2, the fault probability read out at step S1 is stored in the fault probability box of the child node indicated by the selected row of the fault probability table 12 of the test table 2. The fault, probability boxes of the respective nodes are stored in the main memory 1.

At step S3, judgments are made whether or not the fault probability of the node in question (the gas unit node 9a in the case where the test results are as shown in FIG. 4) exceeds a predetermined threshold value, and whether or not the node in question is a leaf (i.e., a bottom node which does not have its own child nodes nor a fault branch tree to be connected thereto). When the fault probability exceeds threshold value and the node in question is a leaf, the search/inference unit 3 determines that the unit designated by the node name is in failure, and terminates the diagnosis. When, on the other hand, the node in question is not a leaf, or when the fault probability of the node is under the threshold value, the execution of the diagnosis proceeds to step S4.

At step S4, it is judged whether the fault probability of the node in question exceeds the predetermined threshold value and whether the node in question has a fault branch tree to be coupled thereto. When the fault probability of the node exceeds the threshold and the node has its fault branch tree, the fault branch tree is loaded from the auxiliary memory 4 into the main memory 1 at step S5. Thus, in the case shown in FIG. 4, the fault branch tree to be coupled to the gas unit node 9a shown in FIG. 3 is loaded into the main memory 1 at step S5. Then, the tests as described in the test table 15 at the root node 14 of the fault branch tree is executed at step S1. By the way, although not shown explicitly in FIG. 2, it is noted that if the fault probability of the node in question exceeds the threshold value and the node in question has a child node stored in the main memory 1, the tests described in the test table at the node in question is executed. For example, if the node in question is the alarm unit node 9b of FIG. 3, the tests described in the test table 2a are effected in a manner similar to that at the root node 8 as described above by reference to FIG. 4.

When the fault probability at the node in question is under the threshold value at step S4, a node of the fault tree stored in the main memory 1 which has a maximum fault probability stored in the fault probability box thereat is selected at step S6 by the search/inference unit 3. At the next step S7, the test associated with the selected node is effected, and the execution of the diagnosis returns to the step S2.

In the above embodiment, the whole fault tree is divided into a main fault tree stored in the main memory 1 and fault branch trees stored in the auxiliary memory 4, such that a fault branch tree is loaded into the main memory 1 as needed. However, the whole fault tree may be stored within the main memory 1 to obtain maximum efficiency. Further, the search/inference unit 3 may be implemented by a hardware instead of a program.

What is claimed is:

1. A fault diagnosis device for determining a cause of fault of a device under test, comprising:

detector means for detecting parameters of a device under test;

memory means;

a fault tree stored in said memory means and having nodes corresponding to respective sub-units of said device under test, whereby said fault tree has a tree structure corresponding to a hardware organization of said device under test;

test tables stored in said memory and associated with respective nodes of said fault tree, each test table including: a description of at least one parameter to be detected by said detector means; at least one test condition with respect to the parameter detected by said detector means; and a fault probability table representing fault probabilities and names of child nodes corresponding to respective results of said test condition; and search/inference means for searching for and determining a cause of fault of said device under test in accordance with said fault tree and said test tables;

wherein at least one of said nodes has at least three child nodes and the test table associated with the node having at least three child nodes includes: a description of at least two parameters to be detected by said detector means; at least two test conditions with respect to the two parameters detected by said detector means; and a fault probability table representing fault probabilities and names of child nodes corresponding to respective patterns of results of said test conditions.

2. A fault diagnosis device as claimed in claim 1, wherein a root node of said fault tree has at least three child nodes.

3. A fault diagnosis device as claimed in claim 1, wherein said memory means comprises a main memory and a auxiliary memory, and said fault tree is divided into a main fault tree stored in said main memory and fault branch trees stored in the auxiliary memory, said search/inference means loading a fault branch tree into the main memory when necessary.

* * * * *